3,439,100
PREVENTING INFLUENZA INFECTIONS WITH BI-
CYCLO(2.2.2)OCTANE-2-METHYLAMINE
Alfred W. Chow, Radnor, Pa., assignor to Smith Kline &
French Laboratories, Philadelphia, Pa., a corporation of
Pennsylvania
No Drawing. Filed Aug. 9, 1966, Ser. No. 571,185
Int. Cl. A61k 27/00; C07c 87/40
U.S. Cl. 424—325    8 Claims

ABSTRACT OF THE DISCLOSURE

Bicyclo[2.2.2]octane-2-methylamine and the α-methyl derivative, or salts thereof, are prepared, formulated and administered to animals to combat influenza infections.

---

This invention relates to a method of ameliorating the effects of and preventing viral infections, in particular influenza infections, by administering to an infected warm-blooded mammal or to such a mammal prior to infection a bicyclo[2.2.2]octane-2-methylamine compound of Formula I, or one of its pharmaceutically acceptable acid addition salts.

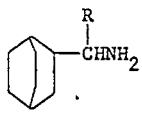

I where R is hydrogen or methyl.

Bicyclo[2.2.2]octane-2-methylamine (R=H) has been previously described in the chemical literature by Alder et al., Chem. Ber. 91, 1516 (1958) and Chem. Ber. 88, 144 (1955). This compound, as far as the present inventor is aware, had never been disclosed to exhibit antiviral activity prior to the present discovery. The α-methyl compound (R=CH$_3$) is itself new, and is thus part of the present invention.

The compounds are active against influenza viruses, particularly influenza A$_2$, Ann Arbor strain. They are active at dosage levels of 5–100 mg./kg. per day.

The compounds are used either in the form of the free bases, or preferably, in the form of a pharmaceutically acceptable acid addition salt thereof. Among these salts are the hydrochloride, sulfate, maleate, and hydrobromide. The compounds or their salts are administered either to prevent infection by influenza virus or to ameliorate the effects of an already existing infection. One of the preferred routes of administration is orally, in the form of a tablet or capsule, either of which may be a sustained release composition. The compositions are formulated in a manner well-known to pharmaceutical chemists, utilizing standard pharmaceutical excipients such as lactose, starch, terra alba, magnesium stearate, calcium sulfate, glyceryl mono or distearate, gelatin, or wax. A second preferred route of administration is intranasally, as a 2–10% spray or drops. The oral compositions may contain 50–500 mg. and may be administered one or more times per day. Bicyclo[2.2.2]octane-2-methylamine has been found to cause a 30–90% increase in the survival of mice infected with influenza A$_2$, Ann Arbor strain at subcutaneous doses of 6.25–25 mg./kg. of test animal per day.

Representative compositions containing bicyclo[2.2.2]octane-2-methylamine as its hydrochloride salt follow:

Tablet:
| | |
|---|---|
| Bicyclo[2.2.2]octane-2-methylamine hydrochloride _____ mg__ | 100 |
| Magnesium stearate _____ mg__ | 2.5 |
| Starch _____ mg__ | 15 |
| Terra alba _____ mg__ | 150 |
| Granulate with syrup or 5% gelatin solution terra alba, q.s.ad _____ mg__ | 300 |

Capsule:
| | |
|---|---|
| Bicyclo[2.2.2]octane-2-methylamine hydrochloride _____ mg__ | 200 |
| Lactose, starch, or terra alba _____ mg__ | 200 |

Nasal solution:
| | |
|---|---|
| Bicyclo[2.2.2]octane-2-methylamine hydrochloride _____ percent w./v__ | [1] 6.31 |
| Eucalyptol, N.F. _____ percent v./v__ | 0.020 |
| Saccharin sodium _____ percent w./v__ | 0.050 |
| Thimerosal, N.F. _____ percent w./v__ | 0.001 |
| Potassium biphthalate _____ percent w./v__ | 0.130 |
| Sodium citrate _____ percent w./v__ | 0.200 |
| Purified water, q.s. ad _____ percent w./v__ | 100.000 |

[1] Equivalent to 5% base.

α-Methylbicyclo[2.2.2]octane-2-methylamine is formulated in the same manner.

EXAMPLE 1

α-Methylbicyclo[2.2.2]octane-2-methylamine

To a mixture of 5.5 g. (0.0363 mole) of bicyclo[2.2.2]oct-2-yl methyl ketone (Chem. Abstr. 45, 1545a), 3.22 g. (0.0463 mole) of NH$_2$HO.HCl and 15 ml. of C$_2$H$_5$OH are added, portionwise with stirring, 3 ml. of water and 5.9 g. (0.147 mole) of powdered NaOH. The mixture is stirred and refluxed for 15 minutes and then poured into an ice cold solution of 20 ml. (0.240 mole) of concentrated HCl in 110 ml. of water. The resulting solid oxime is filtered off and dried.

This oxime (1.07 g., 0.0064 mole) is dissolved in 200 ml. of CH$_3$OH containing some ethereal HCl and 0.3 g. of PtO$_2$ and hydrogenated at 60° and 60 p.s.i. for 10 hours. After evaporation, the hydrochloride salt is recrystallized from methanol-ether to give the pure hydrochloride salt of the title amine. The free base is obtained by the conventional procedure of dissolving the salt in water, making the solution basic, and extracting the free base with ether or other organic solvent.

I claim:
1. A method of preventing influenza infections comprising administering to a warm-blooded mammal an effective, but nontoxic, amount of bicyclo[2.2.2]octane-2-methylamine or α-methylbicyclo[2.2.2]octane - 2 - methylamine, or a pharmaceutically acceptable acid addition salt of one of said compounds.
2. A method as claimed in claim 1, in which the compound is administered orally in the form of a tablet or capsule.
3. A method as claimed in claim 1, in which the compound is administered intranasally.
4. A method as claimed in claim 1, in which the compound is bicyclo[2.2.2]octane-2-methylamine or its hydrochloride salt.
5. An oral dosage unit in the form of a tablet or capsule for the prevention of influenza infections in warm- blooded mammals comprising 50–500 mg. of a compound as defined in claim 1 and a pharmaceutical carrier.

6. An oral dosage unit as claimed in claim 5, in which the compound is bicyclo[2.2.2]octane-2-methylamine or a pharmaceutically acceptable acid addition salt thereof.

7. An intranasal composition for the prevention of influenza infections in warm-blooded mammals consisting of a 2–10% spray or drops comprising a compound as defined in claim 1 or a pharmaceutically acceptable acid addition salt thereof and purified water.

8. An intranasal composition as claimed in claim 7 in which the compound is bicyclo[2.2.2]octane-2-methylamine or a pharmaceuticaly acceptable acid addition salt thereof.

References Cited

Chemical Abstracts 50: 5596g to 5597e (1956).
Chemical Abstracts 53:256f (1959).
Netherlands application 6,507,578, December 1965.

ALBERT T. MEYERS, *Primary Examiner.*

J. GOLDBERG, *Assistant Examiner.*